United States Patent [19]

Termaat et al.

[11] Patent Number: 5,425,064

[45] Date of Patent: Jun. 13, 1995

[54] NUCLEAR TURBINE COOLANT FLOW METER

[75] Inventors: Karel Termaat, Arnhem; Willem J. Oosterkamp, Oosterbeek; Wilhelmus Nissen, Ochten, all of Netherlands

[73] Assignee: N.V. Kema, Netherlands

[21] Appl. No.: 992,168

[22] Filed: Dec. 17, 1992

[30] Foreign Application Priority Data

Dec. 20, 1991 [EP] European Pat. Off. ............ 91203386
Jan. 29, 1992 [NL] Netherlands ......................... 9200161
Sep. 17, 1992 [NL] Netherlands ......................... 9201614

[51] Int. Cl.6 ............................................... G21C 17/00
[52] U.S. Cl. ..................................... 376/246; 376/252;
376/247; 376/245
[58] Field of Search ............... 376/246, 252, 247, 245;
73/861.91, 861.48, 861.74, 861.84

[56] References Cited

U.S. PATENT DOCUMENTS

| | | | |
|---|---|---|---|
| 3,611,207 | 10/1971 | Klahr | 332/7.51 |
| 3,672,209 | 6/1972 | Roach et al. | 73/61 LM |
| 3,735,637 | 5/1973 | Penet | 73/231 R |
| 3,993,539 | 11/1976 | Atherton et al. | 376/246 |
| 4,009,614 | 3/1977 | Sheppard et al. | 73/195 |
| 4,333,355 | 6/1982 | Dacus et al. | 73/861.91 |
| 4,639,349 | 1/1987 | Baratta et al. | 376/254 |
| 4,887,469 | 12/1989 | Shoptaw | 73/861.77 |

FOREIGN PATENT DOCUMENTS

| | | | |
|---|---|---|---|
| 1158645 | 6/1958 | France. | |
| 2413757 | 12/1977 | France | G21C 17/02 |
| 814051 | 10/1948 | Germany. | |
| 820971 | 2/1949 | Germany. | |

OTHER PUBLICATIONS

True Mass Flowmeter-A Mass Flowmeter for Non-steady-State Two-Phase Flow by Class Nuclear Technology vol. 60 Feb. 1983 (pp. 314–319).

Robert H. Lafferty, Jr., "Isotope Technology Development", Flow Measurements with Radioisotopes, Isotopes and Radiation Technology, vol. 8, No. 3, Spring 1971.

Primary Examiner—Donald P. Walsh
Assistant Examiner—Meena Chelliah
Attorney, Agent, or Firm—Webb Ziesenheim Bruening Logsdon Orkin & Hanson

[57] ABSTRACT

Coolant flow (900) in the core (103) of a natural circulation boiling water reactor (100) is monitored by making use of a detector (208) for nuclear radiation and a turbine device (204) which comprises a rotor (304) which can modulate the flux (206) of the nuclear radiation on the detector. The turbine rotor can be installed in a fuel bundle (104), while the detector can be placed in an adjoining instrumentation tube (320). Included in the turbine rotor is material (308) which modulates the radiation field (neutron field and/or gamma field). The radiation detector detects (602) variations in the radiation field when the turbine rotor device is set into rotation by the coolant flow (900). The coolant flow rate is then calculated (603) from the speed of these variations.

16 Claims, 9 Drawing Sheets

NUCLEAR TURBINE COOLANT FLOW METER

The present invention relates to measurement of the liquid flow in for instance a boiling water reactor, and more particularly to a liquid flow meter wherein a turbine rotor is used, and to a nuclear reactor equipped therewith. An important objective of the present invention is to provide more suitable measurement of a coolant flow in a reactor vessel of a nuclear reactor.

Nuclear reactors generate heat through fission of radioactive elements such as uranium isotopes (U-233, U-235) and plutonium isotopes (Pu-239, Pu-241) which are contained in fuel bundles in the reactor core. In boiling water reactors (BWRs) this heat is used to convert liquid water into steam. The steam is conveyed to a steam turbine which can drive a generator to produce electricity. The water not converted to steam is recirculated through the core. Such a nuclear reactor is not equipped with means for generating a forced water flow through the core.

The power output of the reactor must vary in order to meet varying loads. As reactor power increases, a greater coolant flow is required. An insufficient coolant flow can damage the fuel bundles because an isolating layer of steam can form around the fuel pins in the bundle. The isolating layer impairs heat transfer and causes an increase in the temperature in the fuel pin. The high temperature and the steam layer cause rapid oxidation of the cladding of the fuel pins. As a result of oxidation the cladding becomes brittle and subject to breakage. A resulting breach of the cladding exposes fissile fuel to the coolant. The fuel can then leach out into the coolant, which in turn can enter the fuel pin and further erode the fuel. The consequences may be loss of fuel and increased contamination of reactor components with radioactive fuel.

In order to prevent such fuel loss and contamination the flow of the coolant at the fuel bundles must be monitored so that the correct steps can be taken when the coolant flow becomes too low. A method of monitoring the coolant flow is to measure pressure drop across a lower grid plate of the core. The measured pressure drop can then be converted to a flow rate measurement. However, in reactors with a low pressure drop, such as natural circulation boiling water reactors (NCBWRs), the accuracy of the pressure drop method of monitoring coolant flow is limited. Natural circulation boiling water reactors, which rely on convection rather than pumping for coolant circulation, offer significant advantages with respect to reactor economy, reliability and safety.

Another method of monitoring coolant flow is to use electromagnetic pulses. A metal turbine rotor is arranged in the inlet of a fuel bundle. The liquid water flowing through the inlet causes the rotor to turn. The rotation of the rotor generates magnetic pulses. An electrically conductive coil close to the rotor converts the magnetic pulses into electrical pulses. The rate at which the pulses are generated corresponds with the rotation speed of the turbine. The coolant flow rate can be calculated from the turbine rotation speed.

For this purpose the coil must be placed within a few millimeters of the turbine rotor in order to receive a pulse strong enough to enable the pulse generation rate to be determined. Because of the close proximity of the coil it has to be placed within the fuel bundle itself. Signal leads carrying the electrical pulses of the coil to a control room must then be attached to the fuel bundles. The leads make the elements difficult to handle, which complicates refuelling operations. The leads extending from the elements are prone to damage and are easily tangled, which can be inconvenient. For these reasons turbine flow meters have remained restricted to experimental bundles and are not used routinely.

What is required is an improved system for measuring coolant flow through fuel pins in NCBWRs and other reactors with a limited pressure drop. Such a system must preferably not interfere with fuel bundle replacement. In addition, the system must be relatively immune to damage.

The invention is based on the discovery that close to, and namely directly beneath, the core the order of magnitude of the neutron and/or gamma radiation field during operation is still less such that with a turbine assembly a sufficiently large radiation field modulation can be obtained to perform an accurate flow measurement.

In accordance with the present invention a radiation detector detects radiation field modulations resulting from the rotation of a turbine motor induced by a liquid flow. The turbine rotor can comprise a spatially inhomogeneous distribution of nuclear-active material which absorbs neutrons and/or generates nuclear radiation after neutron activation.

A nuclear reactor according to the invention comprises a reactor vessel having received therein a core comprising fuel bundles containing fissionable material and control rods, and which is immersed in water, a water inlet and a steam outlet and a measuring device disposed close to the core for measuring the water flow in the core, which measuring device comprises a turbine assembly having a rotor which is rotatably mounted in a housing and which contains at least one radiation field modulating material, at least one radiation detector for converting the radiation field modulation into a detector signal modulation, and a converter coupled to the radiation detector for converting the detector signal into a value corresponding to the water flow.

The turbine rotor can be placed at the coolant inlet of a fuel bundle where the flow of coolant sets the rotor into rotation. The nuclear-active material is preferably arranged along only a portion of the circumference of the turbine rotor so that rotation of the rotor causes regular modulation of the radiation field. The modulations can be detected at a distance of several centimeters, whereby the nuclear radiation detector can be placed outside the fuel bundle. A converter, such as a frequency analyzer, translates the detector output signal into a flux oscillation rate that corresponds to the rotor revolution speed. The rotor revolution speed yields the coolant flow rate.

In the context of this application the designation "nuclear-active" comprises both materials which absorb nuclear radiation and materials which emit such radiation, as long as the absorption or the emission effects a detectable modulation in the detected radiation field.

Nuclear-emitting material can be chosen such that it will be made radioactive in the core by capture of thermal neutrons produced by operation of the reactor itself, or the nuclear-emitting material can be made radioactive prior to installation in the reactor. By selecting a material that becomes radioactive upon neutron capture in the reactor core, the user can choose the time of activation suited to his purposes. Selection of a source material that emits gamma rays immediately upon neutron capture, which are called prompt gamma rays, ensures that emission of radiation will occur upon exposure of the core to thermal neutrons. Alternatively, a source material that emits delayed gamma rays after neutron capture can also be selected if delayed in-core activation is acceptable. Materials with a relatively high neutron capture cross section must be used to ensure production of sufficient gamma rays for detection.

A core material with delayed emission can also be preactivated by making use of another reactor or a particle accelerator prior to installation in the reactor core. This method ensures a source radiation suitable for immediate detection after installation in the reactor.

Alternatively, a nuclear-active material that absorbs neutrons can be chosen. A strong neutron absorber embedded in the rotor can depress the local neutron field close to the turbine, which causes modulations in the neutron field as the rotor rotates. A neutron-sensitive detector can detect the modulations. The turbine rotation rate and thus the coolant flow rate can be calculated from the modulation of the neutron field.

As neutron-absorbing material can be used 113-Cd and/or 176-180-Hf because of the high thermal neutron absorption coefficient, when the nuclear reactor is operating at 50-100% of its capacity.

As material emitting gamma radiation through neutron activation can be used 110-Ag when the nuclear reactor is operating at 50-100% capacity, or 45-Sc and/or 59-Co when the nuclear reactor is operating at low power or is shut down. These materials have favourable neutron activating properties and optimal gamma decay schemes.

The turbine assembly can simultaneously contain the different types of radiation field-modulating materials, for instance as a composite material such as cadmium-/indium/silver optionally coated with a layer of nickel.

Penetration of gamma and neutron fields can be much greater than that of the magnetic fields generated by rotor movement as in the prior art. Accordingly, the radiation detector can be placed at a greater spatial distance from the turbine assembly than magnetic field detectors. In practical conditions the detector can be placed centimeters from the radiation source in contrast to the millimeters required by the flow meter operating with a magnetic field. The greater detector range enables placing of the detector outside the fuel bundles; it can be placed in the reciprocating in-core probe, an instrument assembly already incorporated in many reactor cores.

Although the use of nuclear radiation to measure the coolant flow can pose problems in some environments, these drawbacks are minimal in a reactor core. The present invention therefore provides a coolant flow meter which is suitable for operation in a low pressure drop environment such as in a NCBWR. The flow meter further makes use of sufficiently remote detection that no leads are required from the fuel bundles. The fuel bundles can thus be exchanged without manipulating or damaging flow meter leads. These and other aspects and advantages of the present invention will be elucidated in the following description with reference to the drawings.

Figure 1:
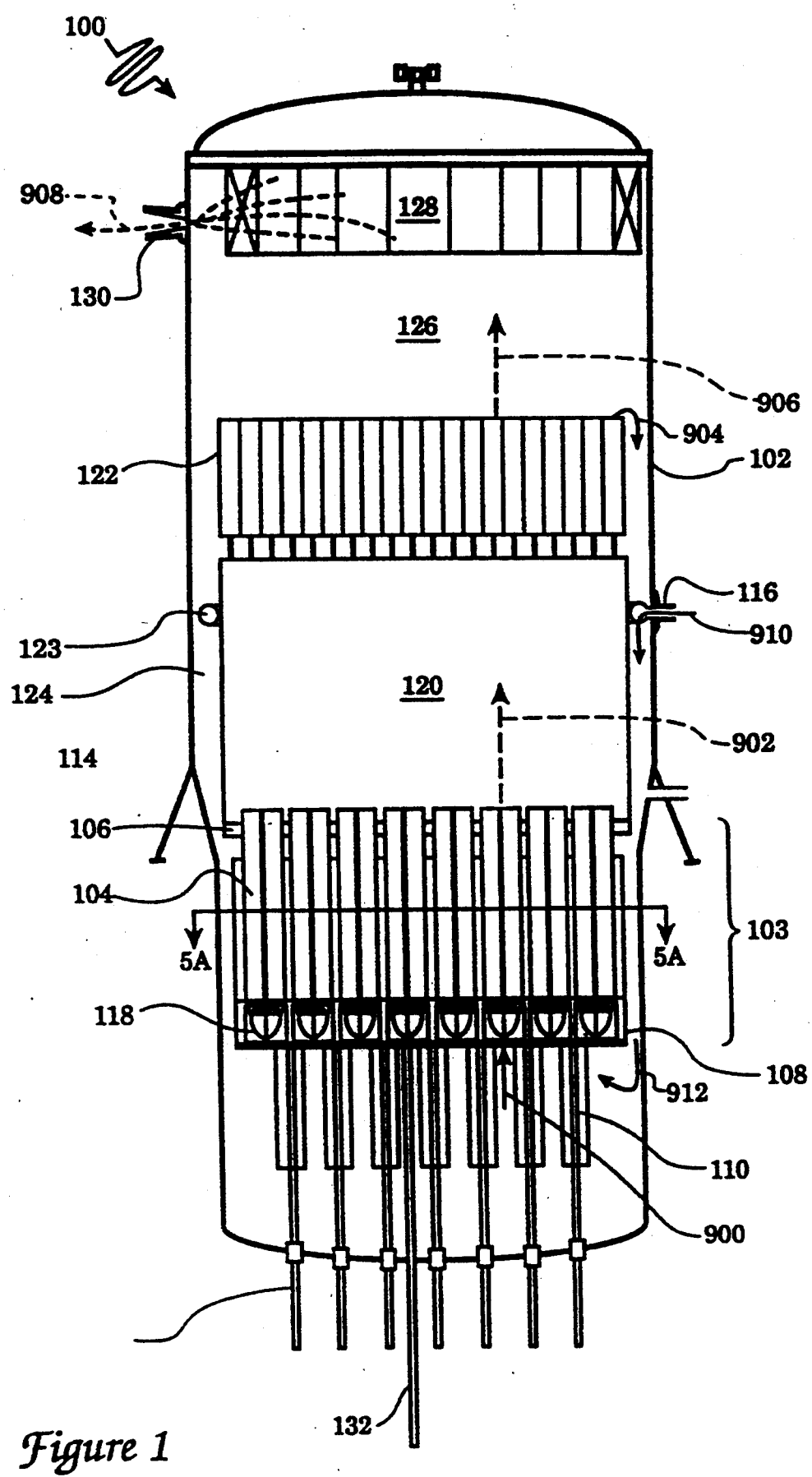
FIG. 1 shows a schematic cross section of a reactor with a fuel bundle inlet assembly with a flow meter according to the present invention.

The present invention is practiced in the context of a nuclear reactor 100 as shown in FIG. 1. A reactor vessel 102 houses fuel bundles 104 containing fissionable material. The reactor core 103 is formed by the fuel bundles 104 which are ordered and supported in the vessel by a top guide 106. A core plate 108 provides lateral support for control rods 110. Control rods 110 can be inserted into and withdrawn from spaces between the fuel bundles 104 by means of control rod drives 112. Monitoring of the core is effected by a reciprocating probe assembly 132.

In reactor 100 water is the coolant. The coolant flow 900 in the core 103 and the steam production in reactor 100 take place in the following manner. Water 910 in liquid form enters the vessel through a coolant inlet 116 and enters fuel bundle inlet 118. As the liquid water flows into the fuel bundles 104 it absorbs thermal energy and rises in temperature until a mixture 902 of steam and water is produced. Because of the space occupied by steam this mixture is less dense than saturated or sub-cooled water 912 arriving beneath the core. The less dense mixture of water and steam rises due to buoyancy forces and is continuously replaced by non-voided coolant 912 entering from beneath the core.

As the steam and water mixture 902 leaves the core 103 it rises in a chimney 120 to steam separators 122 where water 904 is separated by centrifugal forces and added to the return flow via a downcomer annulus 124. The wet steam 906 leaves the top of separators 122 and passes into a wet steam chamber 126 below a steam dryer assembly 128. The moisture is removed by steam dryer assembly 128 and returned through a series of drains to the downcomer annulus 124. The dried steam 908 exits through a steam nozzle 130 to drive a turbine which powers an electricity generator. Through coolant inlet 116 water is admitted into a feedwater sparger to cool the returning coolant and aid circulation. A fuel bundle inlet 118 contains a turbine flow meter according to the present invention.

Figure 2:
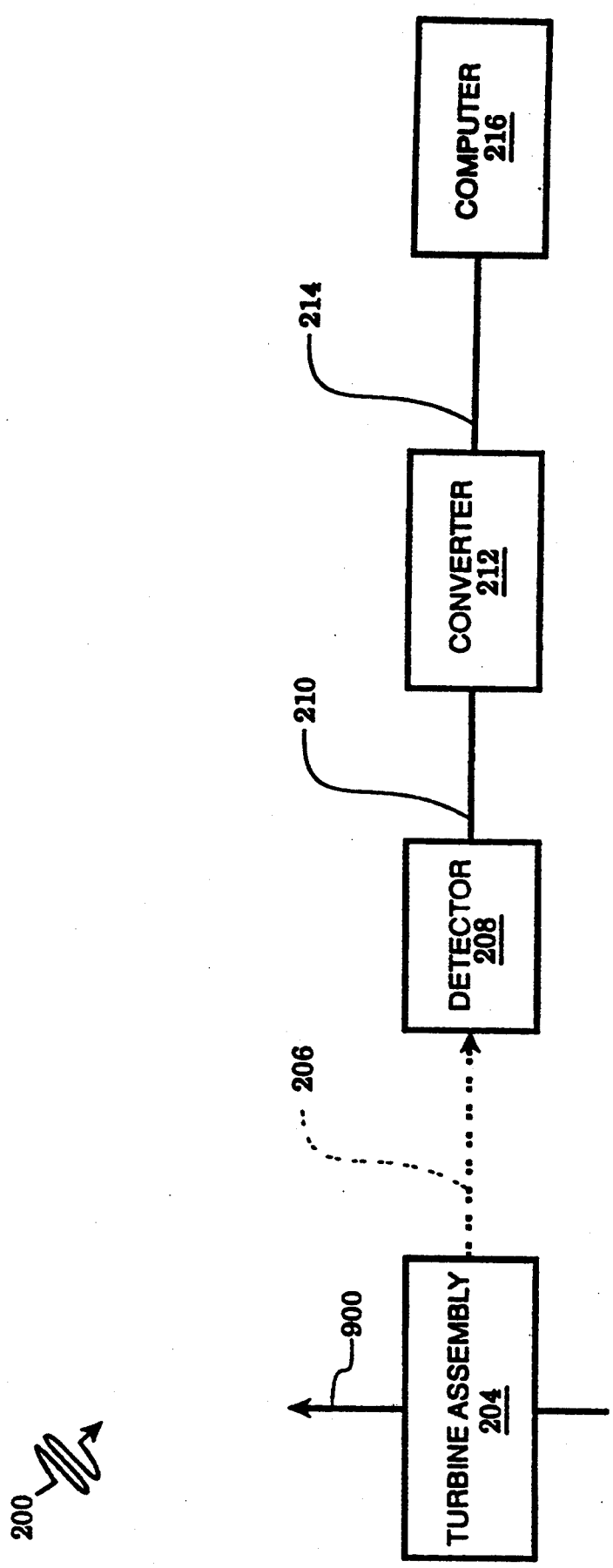
FIG. 2 shows a block diagram of the system of the invention as applied in the reactor of FIG. 1.

A system 200 according to the invention comprises a core coolant flow 109 which causes rotation of a turbine assembly 204 to produce modulations in a radiation field 206 at a radiation detector 208, which transforms the radiation field modulation into an electrical current or voltage modulation as shown in FIG. 2. The readings from radiation detector 208 are transferred through an electrical connection 210 to the converter 212, which is a frequency analyzer and converts the detector signal to a frequency profile and determines the peak value of this profile. The peak value is then transferred through an electrical connection 214 to a computer 216 which uses it to calculate the coolant flow rate. In an alternative embodiment the flow rate value can be communicated to the reactor operator who can then consult a calibration table to determine the coolant flow rate.

Figure 3:
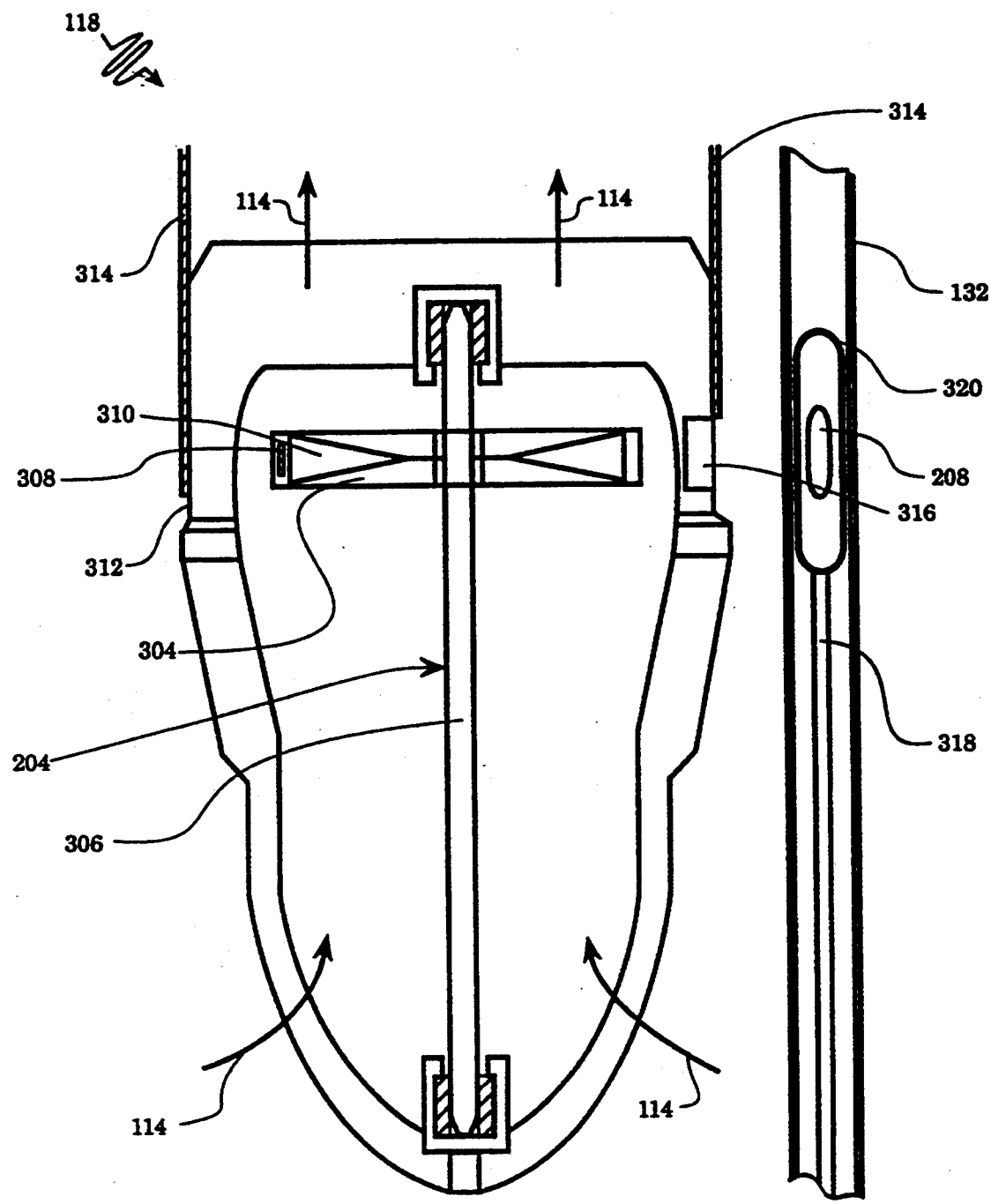
FIG. 3 is an enlarged detail view of a fuel bundle inlet of the reactor of FIG. 1, showing more particularly an embodiment of the flow meter according to the present invention.

A representative fuel bundle inlet 118 is depicted in FIG. 3. Coolant enters the fuel bundle inlet 118 and rises inside the fuel bundle 104 as it heats. The rising coolant sets a turbine rotor 304 into rotation about a turbine shaft 306. Turbine rotor 304 is substantially composed of a ferritic chrome steel. The rotor is coupled to the shaft 306 via a rotor assembly comprising graphite sleeve bearings arranged on an Inconel spindle. A wafer 308 composed of cadmium 113 is embedded in a blade 310 of turbine rotor 304. Cadmium wafer 308 has a diameter of 2 centimeters (cm) and a thickness of 1 millimeter (mm).

During normal operation of the reactor free neutrons are produced and move through the core. When neutrons strike cadmium wafer 308, some are captured by the cadmium nuclei with production of activated (radioactive) cadmium in the reaction $^{113}Cd(n,g)^{114}Cd$. Neutron capture by Cd-113 results in the immediate emission of gamma rays.

The activation of cadmium wafer 308 causes formation of a gamma field 206 which can be detected by radiation detector 208. The detector is inside the reciprocating probe assembly 132 placed outside fuel bundle 104. The reciprocating probe assembly 132 comprises a semi-rigid cable 318 coupled to a reciprocating in-core probe 320 at the end of the cable situated inside the reactor core. For the purpose of signal detection a window 316 is formed in an outer wall 312 of fuel bundle 104 close to the reciprocating in-core probe assembly. The window is formed by removing or omitting the stainless steel cladding 314 over a small area (about 6 cm$^2$) of outer wall 312 of fuel bundle 104.

Because the radioactive material is arranged along only a portion of the circumference of the rotor, the gamma field 206 is temporally modulated as turbine rotor 304 rotates. Because field strength decreases at least as the inverse square of the distance, radiation detector 208 will receive a strong gamma pulse when the cadmium wafer 308 passes close by, wherein the field strength falls off rapidly as wafer 308 moves further away. At a constant rotation rate the spinning rotor 304 will produce a regular pattern of temporally modulated pulses, wherein the pulse frequency corresponds with the rotation rate of turbine rotor 304 and thus with the flow rate of the coolant. The apparatus according to the present invention responds to temporal variations in the gamma field 206. The coolant flow rate can thus be accurately determined despite variations in the average flux of particles at the detector, and can be accurately determined despite other sources of gamma radiation, such as delayed gamma rays from radioactive decay.

The radiation detector 208 comprises an ionization chamber which detects current pulses. Gamma rays entering the ionization chamber of radiation detector 208 bring about a certain amount of ionization. Electrical pulses resulting from ionization are detected by detector 208 and provide a measure of the gamma rays entering the chamber of detector 208.

Figure 4A:
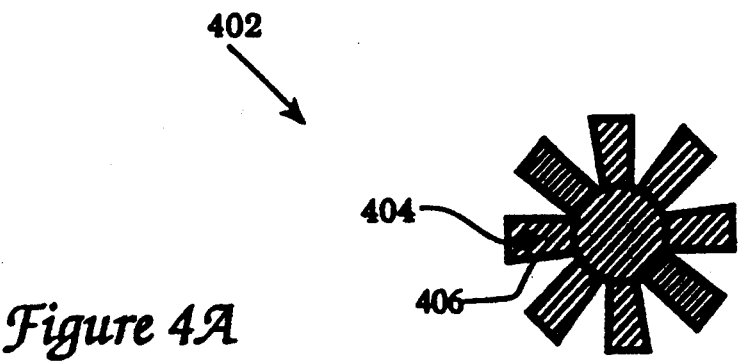
FIG. 4A is a schematic diagram of a rotor of a flow meter placed in a fuel bundle inlet of FIGS. 1 and 3 having a wafer of neutron-absorbing material with prompt gamma ray emission according to the present invention.
Figure 4B:
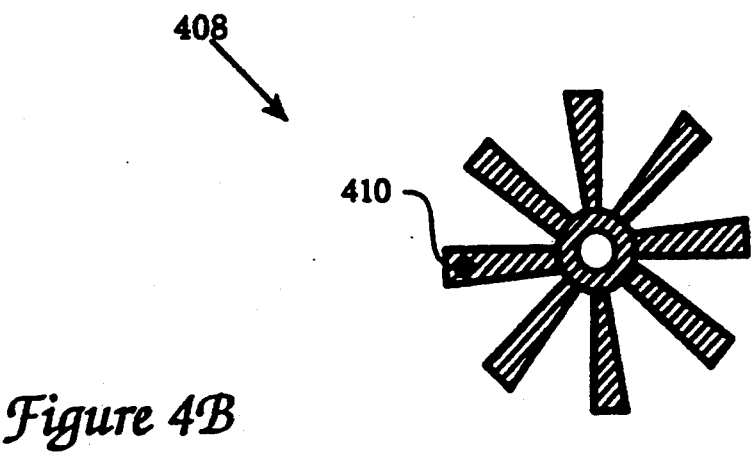
FIG. 4B is a schematic diagram of an alternative rotor of a flow meter placed in a fuel bundle inlet of FIGS. 1 and 3 having a wafer of neutron-absorbing material with delayed gamma ray emission as according to the present invention.
Figure 4C:
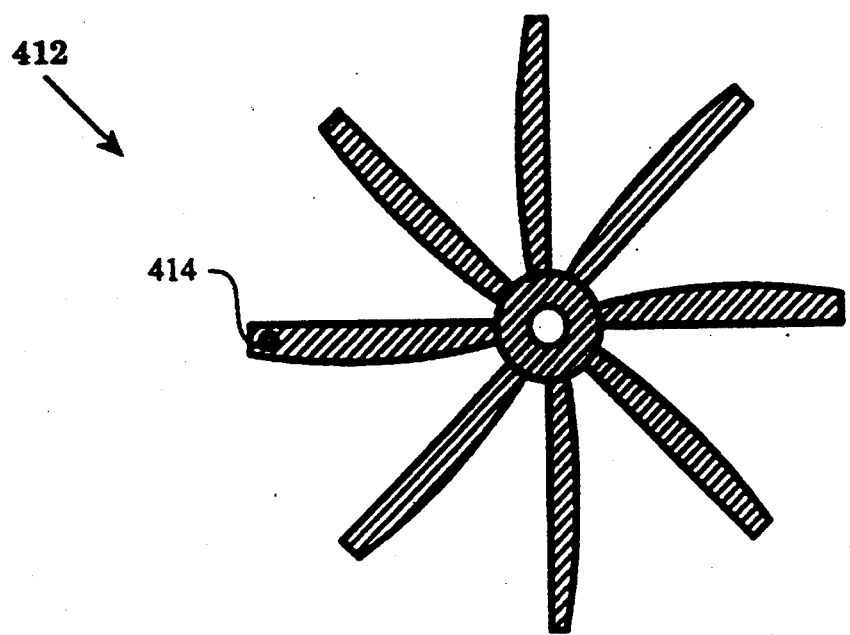
FIG. 4C is a schematic diagram of another alternative rotor of a flow meter placed in a fuel bundle inlet of FIGS. 1 and 3 having a wafer of neutron-absorbing nuclear active material as according to the present invention.

Alternative configurations of rotor 304 are shown in the FIGS. 4A, 4B and 4C, showing more particularly representative rotor blades and alternatives to nuclear-active material 308. A small rotor 402 as shown in FIG. 4A fits a turbine with a throat diameter of 40 millimeters (mm) and is suitable for a coolant flow rate of 1 to 6.5 liters per second (l/s). The rotor is composed substantially of ferritic chrome steel. Nuclear-active material 404 is embedded in one of the blades 406 of rotor 402. Nuclear-active material 404 is a wafer of cobalt-59 that is activated (made radioactive) by the neutron field prevailing during operation according to the reaction $^{59}Co(n,g)^{60}Co$ after placement in the reactor inlet. Delayed gamma rays from the 5.27-year half-life cobalt-60 can be detected by radiation detector 208. As rotor 402 rotates, modulations in the gamma field emitted by the cobalt wafer are detected by detector 208. The detector signal is converted by converter 212 to a reciprocal time value from which computer 216 can determine the coolant flow rate.

An alternative rotor 408 fits a turbine with a throat diameter of 59 mm and is suitable for a coolant flow rate in a range of 1.5 to 10 l/s, as shown in FIG. 4B. The rotor is composed substantially of ferritic chrome steel. The nuclear-active material 410 is a wafer comprising cobalt-59 which has not been preactivated before placement in the reactor inlet. The cobalt wafer is activated by the capture of neutrons generated by the normal operation of the reactor. After activation delayed gamma rays from the decay of the cobalt-60 can be detected by detector 208. As rotor 408 rotates, modulations in the gamma field emitted by the cobalt wafer after activation are detected by detector 208, enabling the coolant flow rate to be determined as described above.

A large rotor 412 as shown in FIG. 4C fits a turbine throat diameter of 150 mm. Nuclear-active material 414 is a wafer comprising gadolinium. The gadolinium wafer has a high neutron capture cross section and absorbs sufficient neutrons to depress the local neutron field in the region of the turbine. As rotor 412 rotates, modulations in the neutron field are detected by a neutron-sensitive detector similar to detector 208, enabling the coolant flow rate to be determined as described above.

Figure 5A:
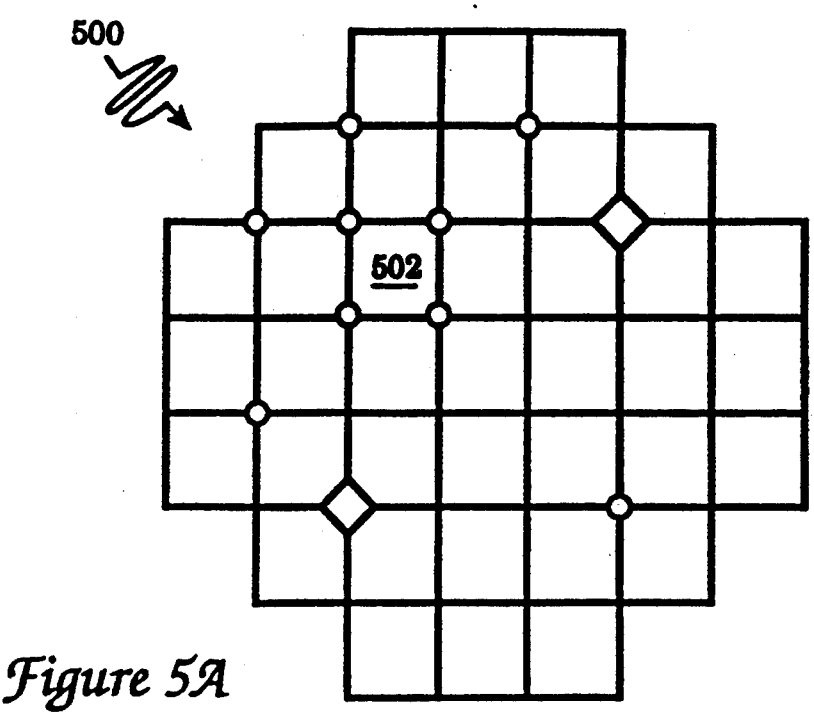
FIG. 5A is a schematic diagram of a part of the cross section of the core of a nuclear reactor along plane 5A of FIG. 1.
Figure 5B:
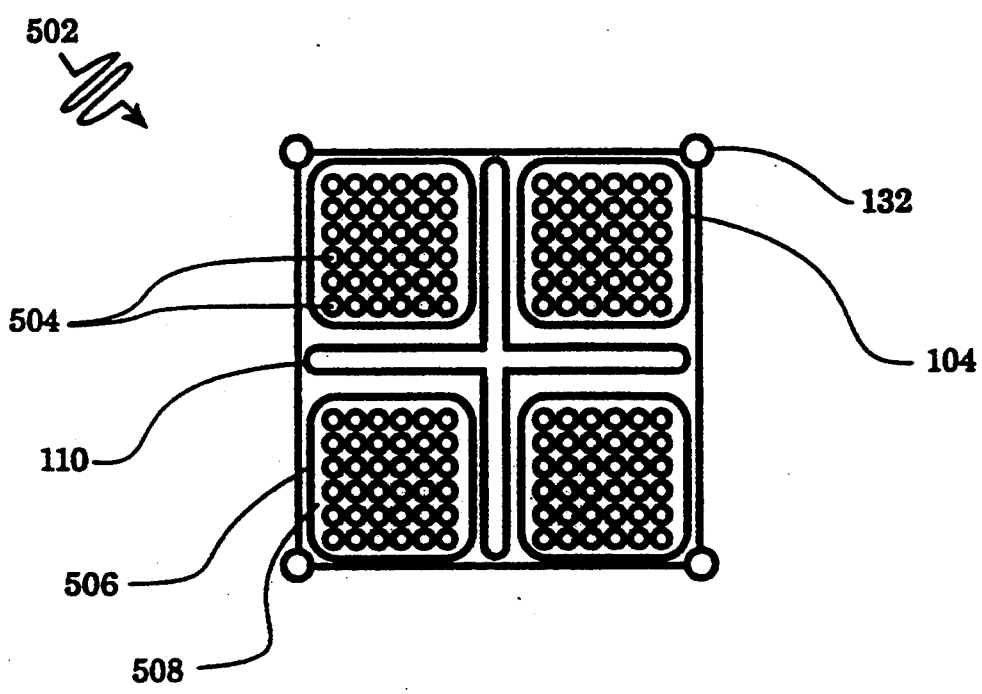
FIG. 5B is an enlargement of a portion of FIG. 5A showing more particularly the configuration of fuel rods, control rods and instrumentation tubes in the core of the reactor of FIG. 1.

FIG. 5A shows the disposition of elements inside reactor core 102 in a cross section along plane 5A of FIG. 1. Control cell 502 comprises fuel pins 504 ordered into fuel bundles 104 which are placed around control rods 110 as shown in FIG. 5B. A reciprocating in-core probe assembly 132 containing a radiation detector 208 is positioned outside fuel bundles 104, as shown in FIG.

5B. A channel wall 506 around each fuel bundle 104 defines a channel 508 through which flows coolant. Coolant flowing through the channel 508 envelops the fuel pins 504 and is therein heated by thermal neutrons generated during operation of the reactor.

Figure 6:
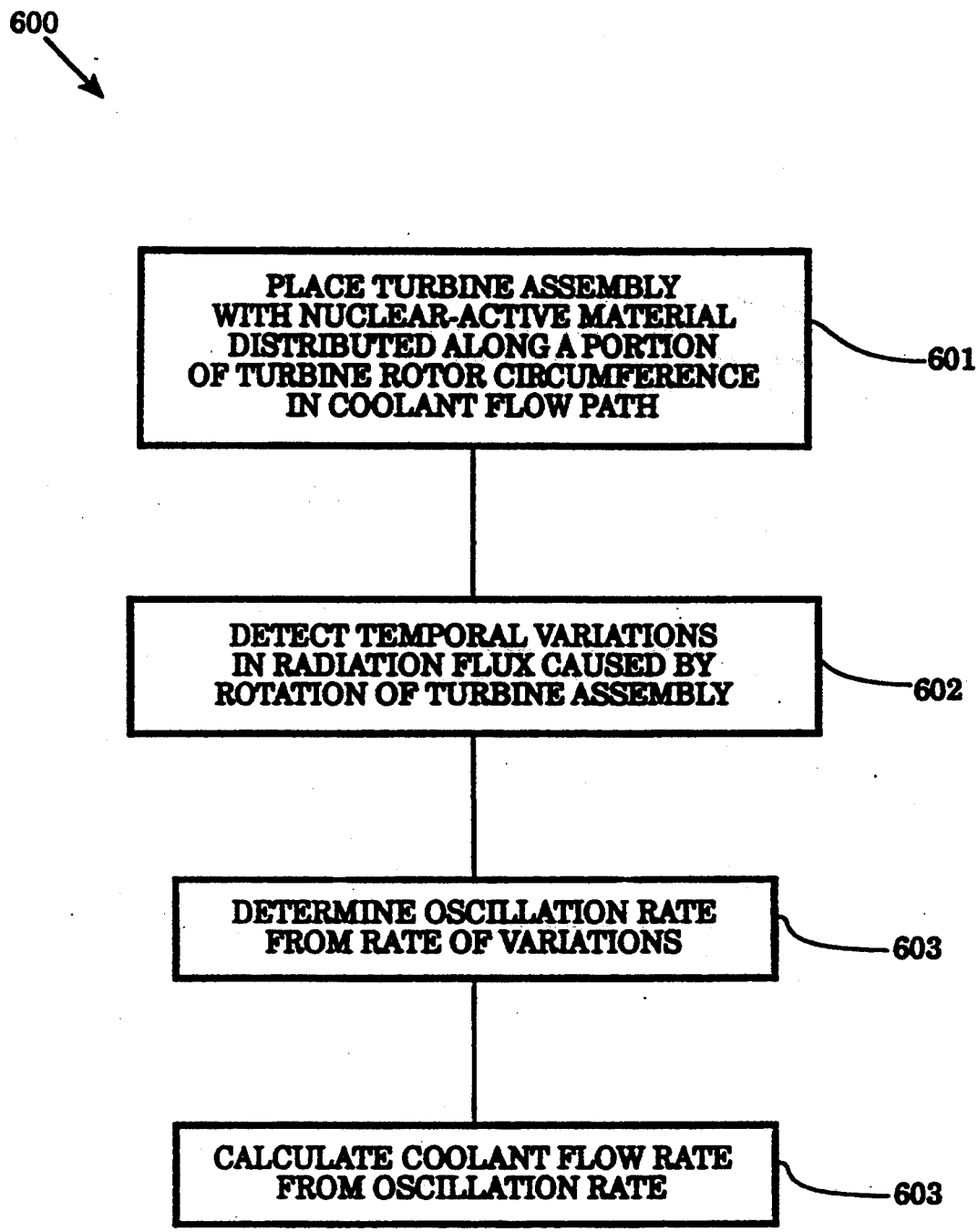
FIG. 6 shows a flow chart of the successive steps of a method of the present invention as applied in practice in the context of the reactor of FIG. 1.
Figure 7:
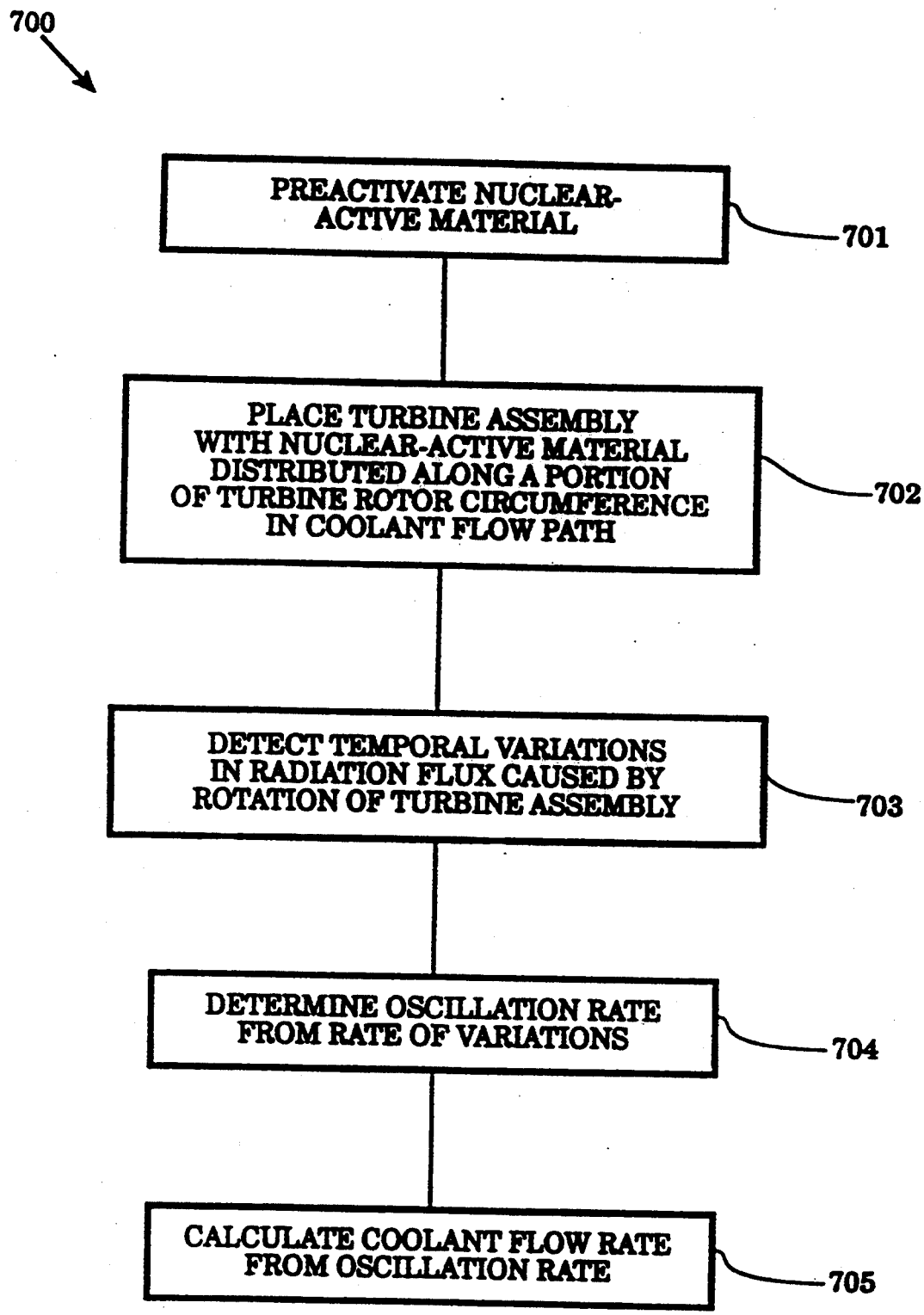
FIG. 7 shows a flow chart of the successive steps of an alternative method of the present invention as applied in practice in the context of the reactor of FIG. 1.

A method 600 according to the present invention comprises four steps 601–604 as shown in FIG. 6. Method 600 is applied in practice in the context of reactor 100. In the first step 601 a turbine assembly 204 is placed in the path of the flowing coolant of a nuclear reactor 100 so that the coolant flow 900 causes the rotor 304 of the turbine assembly 204 to rotate. Temporal variations in the radiation field corresponding to spatial variations in the emission of radioactive particles are then detected at 602. An oscillation speed is determined at 603 from the output signal of the detector. Finally, the coolant flow rate is determined at 604 from the rate of the temporal variations. An alternative method 700 according to the present invention comprises five steps 701–705 as depicted in FIG. 7. Nuclear-active material is preactivated at step 701 to emit delayed gamma rays before the rotor assembly containing the nuclear-active material is placed at 702 into the path of the flowing coolant of a nuclear reactor 100. When the flowing coolant 900 turns the rotor 304 of the turbine assembly 204, temporal variations in the gamma flux are detected at 703. An oscillation rate is determined at 704 from the detector output signal. Finally, the coolant flow rate is determined at 705 from the rate of the temporal variations.

Figure 8:
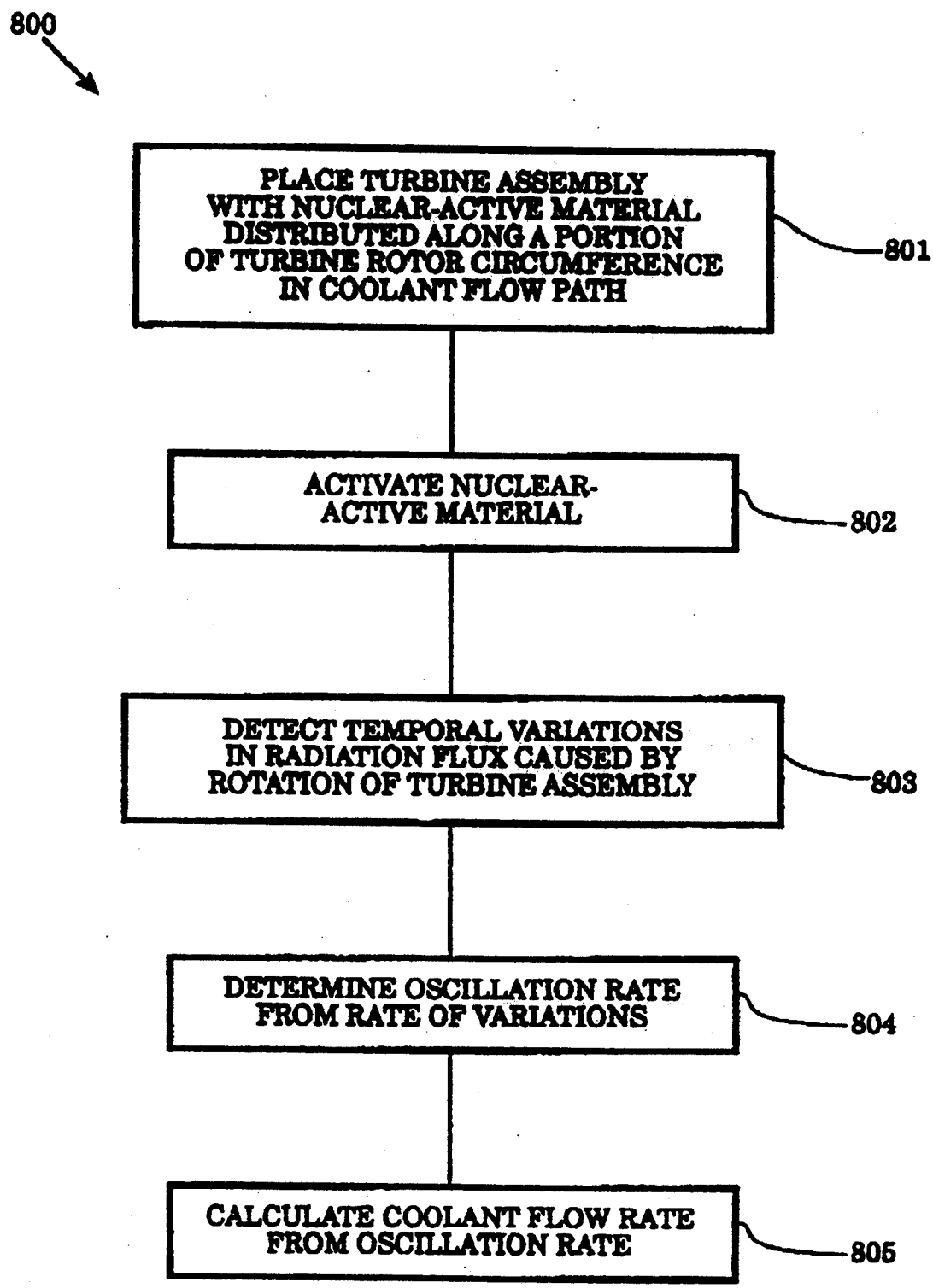
FIG. 8 is a flow chart of the successive steps of an alternative method of the present invention as applied in practice in the context of the reactor of FIG. 1.

An alternative method 800 according to the present invention comprises five steps 801–805 as designated in FIG. 8. According to method 800, applied in practice in the context of reactor 100, a turbine assembly 204 comprising a rotor with nuclear-active material 404 is placed at 801 in the path of the flowing coolant of a nuclear reactor 100 so that the coolant flow 900 causes the rotor 304 of the turbine assembly 204 to rotate. According to method 800, a rotor with nuclear-active material 404 is used as shown in FIG. 4A. The nuclear-active material, cobalt-59, is activated in-situ at 802 by the neutrons produced in reactor core 103 during operation of the reactor. After activation the nuclear-active material emits delayed gamma rays. Temporal variations in the radiation flux emitted from the activated material can then be detected at 803, enabling the oscillation rate to be determined at 804 and the coolant flow rate to be calculated at 805.

Figure 9:
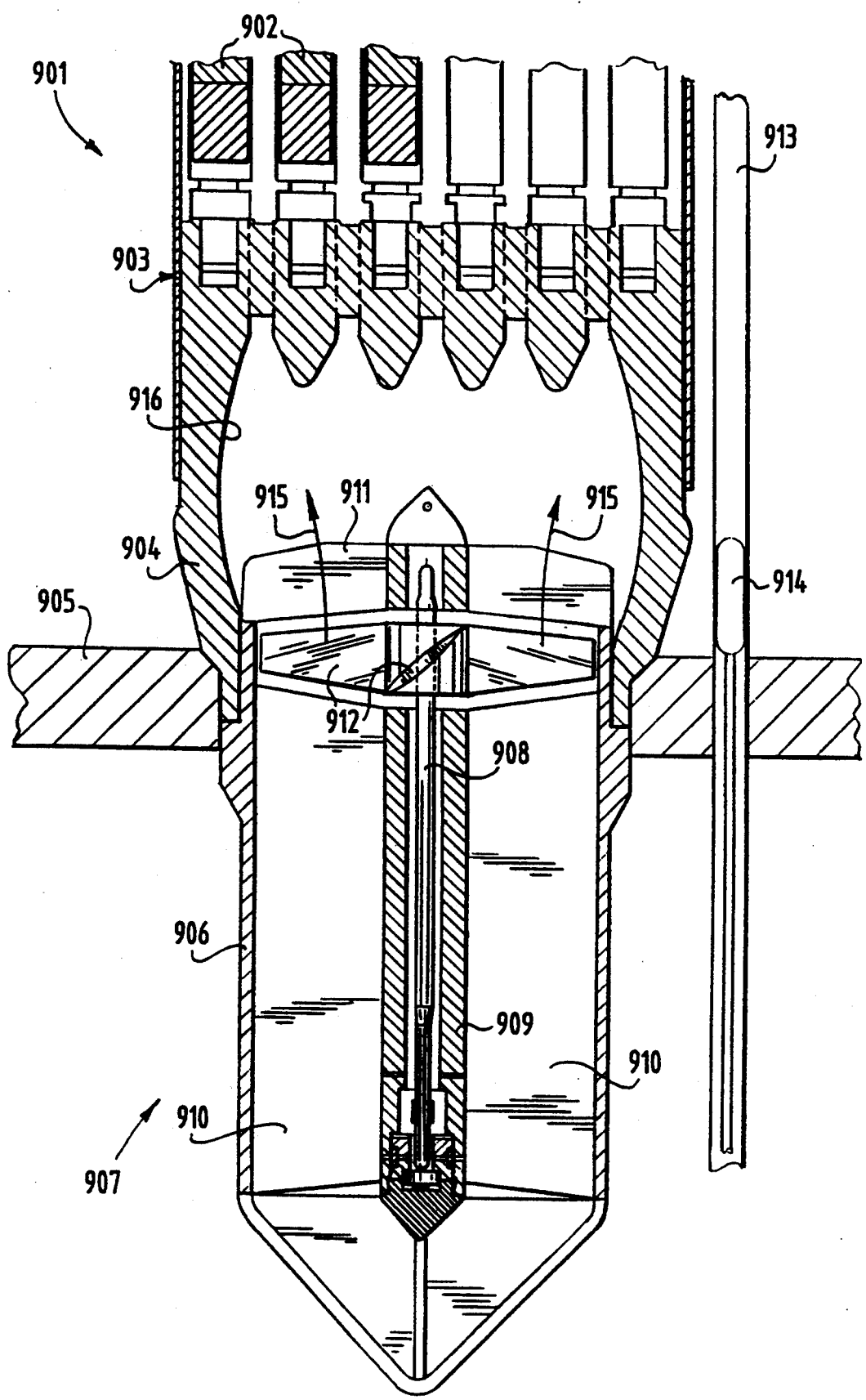
FIG. 9 shows another embodiment of the flow meter according to the invention shown in FIG. 3.

FIG. 9 shows a reactor vessel 901 with a core 903 comprising fuel bundles 902 which is connected via a liquid inlet piece 904 to a support plate 905. Connecting onto the inlet piece 904 is a cylindrical housing of the turbine assembly 907 according to the invention which passes through the support plate 905.

The turbine assembly 907 comprises a rotor 908 rotatably mounted in housing 906 in that a bearing housing 909 is connected to housing 906 via guide plates 910 and 911.

The rotor blades 912 are manufactured from a composite material (alloy) on a basis of cadmium/indium/silver. The neutron field as well as the gamma field can thus be modulated with the rotor blades 912.

Arranged axially along the core 903 is a detector tube 913 through which a detector assembly can be guided for detecting fluctuations in the neutron field and/or gamma field which are converted into a detector signal that is fed to the converter which forms part of the measuring device according to the invention and with which the detector signal is converted with a value corresponding to the water flow 915 through an inlet 916 of core 903.

The system also provides for other systems, such as a piston assembly, which comprise a nuclear source material enabling the flow rate to be determined from modulations in the radiation field. In the case of an apparatus with a piston, the movement of the piston causes temporal variations in the radiation flux.

The nuclear-active material need not be in wafer form and can be rigidly attached to the rotor or, in an alternative embodiment, be included in the rotor. The nuclear-active material does not have to be confined to a small area on the rotor; it can be distributed over the whole rotor as long as the resulting distribution produces a sufficiently varying field, as for instance in the case where there are gaps between the rotor blades. The field modulation need not take place as a consequence of rotation of nuclear-active material, but can occur when a rotor comprises a material with a moderator strength differing from that of water; the rotor displaces water so that rotation of the water causes a differential moderation of the core fast neutrons, which will cause modulations in the radioactive field at the detector which correspond to the rotor rotation rate. Rotors may have other configurations than those shown and may be composed of any material suitable for a turbine used in the reactor core environment of a nuclear reactor. A rotor can be coupled to a shaft by any means enabling a rotation which results in radiation field modulation, including rotor assemblies with sapphire ball bearings in steel races.

The invention comprises the use of other sources of prompt gamma rays, such as boron, gadolinium, chlorine, indium, mercury, samarium, manganese and neodymium. Other sources of delayed gamma rays comprise iridium. The detected radiation is not limited to gamma rays and thermal neutrons but may comprise any radiation which creates a field which can be detectably modulated by the described system. The invention provides for reactors of other types, including forced circulation reactors, and for other than nuclear environments in which a system as disclosed can be installed. These and other variations to and modifications of the described embodiments are provided for by the present invention, the scope of which is limited only by the following claims.

We claim:

1. A nuclear reactor comprising:
   a reactor vessel having included therein a core which includes fuel bundles containing fissionable material and control rods and which is immersed in water, a water inlet and a steam outlet and a measuring device disposed in the vicinity of said core for measuring the water flow in said core, which core produces in its vicinity a radiation field acting as a radiation source for a measuring device, wherein said measuring device includes:
   a turbine assembly having a rotor which is rotatably mounted in a housing and which contains at least one radiation field-modulating material for modulating the radiation field produced by the core,
   at least one radiation detector for converting the radiation field modulation into a detector signal modulation, and
   a converter coupled to said radiation detector for converting said detector signal into a value corresponding to the water flow.

2. The nuclear reactor as claimed in claim 1, wherein said radiation field-modulating material is a neutron-absorbing material.

3. The nuclear reactor as claimed in claim 2, wherein said neutron-absorbing material includes 113-Cd and 176-180-Hf.

4. The nuclear reactor as claimed in claim 1, wherein said radiation field-modulating material is a material emitting gamma radiation through neutron activation.

5. The nuclear reactor as claimed in claim 4, wherein said gamma radiation-emitting material comprises 45-Sc, 59-Co and 110-Ag.

6. The nuclear reactor as claimed in claim 1, wherein said rotor contains a neutron-absorbing material and a material emitting gamma radiation through neutron activation.

7. The nuclear reactor as claimed in claim 6, wherein both radiation field-modulating materials form a composite material.

8. The nuclear reactor as claimed in claim 7, wherein said composite material comprises 113-Cadmium/Indium/110-Silver.

9. The nuclear reactor as claimed in claim 1, wherein said radiation field-modulating material is included in a rotor blade.

10. The nuclear reactor as claimed in claim 1, wherein said housing of said turbine assembly connects into a water inlet of said core.

11. The nuclear reactor as claimed in claim 1, wherein guide plates are received in said housing of said turbine assembly.

12. The nuclear reactor as claimed in claim 1, wherein said radiation detector is received in a detector tube extending axially along said core.

13. A measuring device for measuring in a nuclear reactor the water flow in a core, which core produces in its vicinity a radiation field acting as a radiation source for a measuring device, comprising a turbine assembly having a rotor which is rotatably mounted in a housing and which contains at least one radiation field-modulating material for modulating the radiation field .produced by the core, at least one radiation detector for converting the radiation field modulation into a detector signal modulation, and a converter coupled to said radiation detector for converting said detector signal into a value corresponding to the water flow.

14. A method for measuring a liquid flow in a nuclear reactor comprising a heat-producing core and a coolant flowing along a coolant path through the core, which method comprises the steps of:

placing a turbine assembly which includes a rotor, which rotor includes a radiation field-modulating material which can cause spatial variations in a radiation flux in the coolant path such that the flow of said coolant sets said rotor of said turbine device into rotation;

detecting with a detector temporal variations in said radiation field which correspond to spatial variations in said radiation field;

determining an oscillation frequency from variations in the output of said detector; and calculating the liquid flow rate of said coolant from said oscillation frequency.

15. The method as claimed in claim 14, wherein said radiation field-modulating material absorbs neutrons so that said radiation field-modulating material modulates the neutron field.

16. The method as claimed in claim 14, wherein said radiation field-modulating material is activated by neutrons so that said radiation field-modulating material emits prompt or delayed gamma rays only after placing of turbine assembly.

* * * * *